(12) United States Patent
Stewart

(10) Patent No.: US 9,160,636 B2
(45) Date of Patent: Oct. 13, 2015

(54) SYSTEM AND METHOD FOR MONITORING NETWORK LINK QUALITY

(71) Applicant: Metaswitch Networks Ltd, Enfield, Middlesex (GB)

(72) Inventor: Mark Stewart, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 96 days.

(21) Appl. No.: 13/967,991

(22) Filed: Aug. 15, 2013

(65) Prior Publication Data

US 2014/0029462 A1 Jan. 30, 2014

Related U.S. Application Data

(63) Continuation of application No. PCT/GB2012/050346, filed on Feb. 15, 2012.

(30) Foreign Application Priority Data

Feb. 15, 2011 (GB) .................... 1102633.3

(51) Int. Cl.
| | |
|---|---|
| *H04L 12/66* | (2006.01) |
| *H04L 12/26* | (2006.01) |
| *H04M 3/22* | (2006.01) |
| *H04M 7/00* | (2006.01) |
| *H04L 29/06* | (2006.01) |

(52) U.S. Cl.
CPC ............. *H04L 43/06* (2013.01); *H04L 43/08* (2013.01); *H04L 65/1006* (2013.01); *H04L 65/1069* (2013.01); *H04L 65/80* (2013.01); *H04M 3/2236* (2013.01); *H04M 7/006* (2013.01)

(58) Field of Classification Search
CPC ......... H01L 47/10; H01L 47/30; H01L 47/11; H01L 47/12; H01L 47/15; H01L 47/2441; H01L 47/70; H01L 47/05

USPC .......... 370/230–235, 237, 248, 249, 352–356
See application file for complete search history.

(56) References Cited

U.S. PATENT DOCUMENTS

| | | | |
|---|---|---|---|
| 4,799,211 A | 1/1989 | Felker et al. | |
| 7,505,567 B1 | 3/2009 | Eslambolchi et al. | |
| 7,616,579 B2 | 11/2009 | Slattery | |
| 2006/0221942 A1 | 10/2006 | Fruth et al. | |
| 2006/0274760 A1* | 12/2006 | Loher ...................... | 370/395.52 |

FOREIGN PATENT DOCUMENTS

WO       2006133220 A2    12/2006

OTHER PUBLICATIONS

Search Report issued in International Application No. PCT/GB2012/050346.

* cited by examiner

*Primary Examiner* — Dady Chery

(74) *Attorney, Agent, or Firm* — EIP US LLP

(57) ABSTRACT

Monitoring network link quality in a telecommunications network which includes a plurality of intermediate network elements connected to network links via which communications sessions are conducted between respective terminating devices. A communications session comprises signaling procedures relating to the control of the session and media transfer procedures for transmitting media content via a media path established using at least part of the procedures. The established media path includes media path legs which are each established between respective media path leg endpoints connected via a network link. One or more endpoints of a media path leg is determined from at least part of the procedures. The determined one or more endpoints includes a media path leg endpoint at an intermediate network element. Reporting data is generated that comprises data identifying the determined one or more endpoints. The reporting data is transmitted to an analysis system for network link quality analysis.

31 Claims, 7 Drawing Sheets

| Report number | Call start | Call End | Call ID | Caller ID | Called ID | Source IP | Dest IP | Other IP | Measured QoS | Received QoS |
|---|---|---|---|---|---|---|---|---|---|---|
| 1 | csVal1 | ceVal1 | | IV1 | IV1 | sIP1 | dIP1 | | | |
| 2 | | | cID1 | | | sIP2 | dIP2 | | | |
| 3 | csVal1 | ceVal1 | cID1 | IV1 | IV1 | sIP3 | dIP3 | | | qosV1 |
| ... | ... | ... | ... | ... | ... | ... | ... | ... | ... | ... |

Figure 9

SYSTEM AND METHOD FOR MONITORING NETWORK LINK QUALITY

CROSS REFERENCE TO PRIOR APPLICATIONS

This application is a continuation of International Application No. PCT/GB2012/050346, filed Feb. 15, 2012 and designating the U.S., which claims priority to Great Britain Patent Application No. GB1102633.3, filed Feb. 15, 2011, which is incorporated herein by reference in its entirety.

FIELD OF THE INVENTION

The present invention relates to a system and method for monitoring network link quality for communications sessions in a telecommunications network. In particular, but not exclusively, the invention relates to monitoring network link quality for communications sessions that are voice calls.

BACKGROUND OF THE INVENTION

Methods for monitoring network link quality in a telecommunications network, in which voice calls are made, are known where Quality of Service (QoS) information for voice calls is generated in order to allow network link quality of the telecommunications network to be analyzed.

US patent application number 2006/0221942 describes identification of potential routes taken by voice calls between terminating devices in a telecommunications network by using a traceroute program to identify the potential routes. The identified potential routes taken by the voice calls can then be combined with QoS information for the voice calls in order to create a characterization of the network elements and/or call routes in the telecommunications network and allow network link quality analysis to be conducted.

U.S. Pat. No. 7,616,579 describes identification of potential routes taken by voice calls between terminating devices in a telecommunications network by using routing table information gathered from the network elements in the telecommunications network. Again, the identified potential routes taken by the voice calls can then be combined with QoS information for the voice calls in order to create a characterization of the network elements and/or call routes in the telecommunications network and allow network link quality analysis to be conducted.

Information relating to potential routes taken by voice calls between terminating devices may not provide the actual route taken by the voice calls. Therefore network link quality analysis conducted using this information may lead to false identification of problematic portions of the telecommunications network and/or omission of actual problematic portions of the telecommunications network.

It would be desirable to provide an improved system and method for monitoring network link quality in a telecommunications network.

SUMMARY OF THE INVENTION

In accordance with a first aspect of the invention, there is provided a method for monitoring network link quality in a telecommunications network which includes a plurality of intermediate network elements connected to network links via which communications sessions are conducted between respective terminating devices, a said communications session comprising signaling procedures relating to the control of the communications session and media transfer procedures for transmitting media content via a media path established using at least part of said signaling procedures, the established media path including media path legs which are each established between respective media path leg endpoints connected via a said network link, the method comprising:

determining one or more endpoints of a said media path leg from at least part of said signaling procedures, said determined one or more endpoints including a media path leg endpoint at a said intermediate network element;

generating reporting data comprising data identifying said determined one or more endpoints; and transmitting said reporting data to an analysis system for network link quality analysis.

In accordance with a second aspect of the invention, there is provided a network element for use in monitoring network link quality in a telecommunications network, the telecommunications network including a plurality of intermediate network elements connected to network links via which communications sessions are conducted between respective terminating devices, a said communications session comprising signaling procedures relating to the control of the communications session and media transfer procedures for transmitting media content via a media path established using at least part of said signaling procedures, the established media path including media path legs which are each established between respective media path leg endpoints connected via a said network link, the network element being configured to:

determine one or more endpoints of a said media path leg from at least part of said signaling procedures, said determined one or more endpoints including a media path leg endpoint at a said intermediate network element;

generate reporting data comprising data identifying said determined one or more endpoints; and transmit said reporting data to an analysis system for network link quality analysis.

In accordance with a third aspect of the invention, there is provided an analysis system for monitoring network link quality in a telecommunications network, the telecommunications network including a plurality of intermediate network elements connected to network links via which communications sessions are conducted between respective terminating devices, a said communications session comprising signaling procedures relating to the control of the communications session and media transfer procedures for transmitting media content via a media path established using at least part of said signaling procedures, the established media path including media path legs which are each established between respective media path leg endpoints connected via a said network link, the analysis system being configured to:

receive reporting data comprising data identifying determined one or more endpoints of a said media path leg, said determined one or more endpoints including a media path leg endpoint at a said intermediate network element;

process said reporting data to determine at least part of the media path established for the communications session; and assess network link quality for at least one network link in the data communications network on the basis of said media path determination and quality of service data relating to said communications session.

Further features and advantages of embodiments of the invention will become apparent from the following description of preferred embodiments of the invention, given by way of example only, which is made with reference to the accompanying drawings.

BRIEF DESCRIPTION OF THE DRAWINGS

FIG. 9 illustrates a table of information contained in three reports received by the analysis system of FIG. 1, according to an embodiment of the invention.

DETAILED DESCRIPTION OF THE INVENTION

Figure 1:
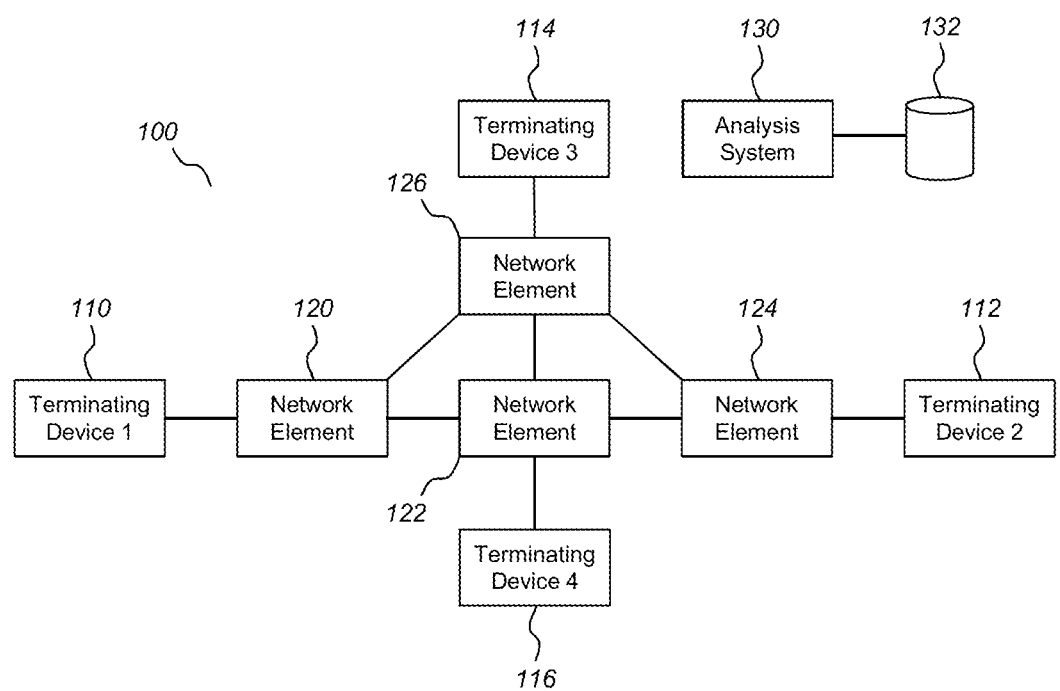
FIG. 1 schematically illustrates an example telecommunications network, according to an embodiment of the invention.

The present invention relates to a system and method for monitoring network link quality in a telecommunications network. Communications sessions may be conducted over the telecommunications network between terminating devices, where each communications session is conducted via network links of intermediate network elements of the telecommunications network.

Each communications session is conducted by using signaling procedures that relate to the control of the communications session, as well as by using media transfer procedures for transmitting media content for the communications session via one or more media paths. This involves signaling messages being sent via a signaling path. One or more network elements of the telecommunications network may perform processing in relation to the signaling procedures and/or the media transfer procedures of a communications session in order for that communications session to be conducted between terminating devices in the telecommunications network.

In one embodiment of the invention a signaling procedure, using a protocol such as the Session Initiation Protocol (SIP), may be used to set up and control a communications session between terminating devices in response to a request made by the user of one of the terminating devices. Once the communications session has been set up between the terminating devices, media content for conducting at least part of the communications session may be transmitted via one or more media paths, which are typically different to the signaling path. A streaming media protocol such as the Real-time Transport Protocol (RTP) may be used in conjunction with a media stream control protocol such as the Real-time Transport Control Protocol (RTCP) to transmit media content via a media path.

Some network elements may perform processing in relation to the signaling procedures of a communications session. For example, a network element may act as a SIP proxy server in order to assist a terminating device in routing a request relating to a communications session to one or more other terminating devices participating in the communications session. As well as acting as a SIP proxy server, the network element may also perform other functions in relation to a communications session such as acting as a Session Border Controller (SBC), Softswitch, etc. as described in greater detail below.

Some network elements may perform processing in relation to the media transfer procedures of a communications session. For example, a network element may assist in routing media content relating to a communications session along a media path to one or more other terminating devices participating in the communications session.

According to embodiments of the invention, in the process of conducting signaling procedures and/or media transfer procedures a network element may determine information relating to the communications session, as described in further detail below. The network elements may be configured to transmit the determined information to an analysis system to which each network element may be connected via data communication links.

The analysis system may store the determined information that it receives in a database and then correlate the stored information in order to analyze the quality of network links in the communications network.

FIG. 1 schematically illustrates an example telecommunications network 100 that includes a plurality of network elements 110-126 including plurality of terminating devices 110-116 and a plurality of intermediate network elements 120-126, according to embodiments of the invention.

The terminating devices 110-116 and intermediate network elements 120 and 126 are each capable of conducting communications sessions using signaling procedures and media processing procedures. Each terminating device 110-116 could for example include a Voice over Internet Protocol (VoIP) phone, or a computing device configured to conduct VoIP communications sessions. Each intermediate network element 120-126 could for example include a computer server that includes hardware and/or software implementing a SIP proxy server, Session Border Controller, and/or Softswitch.

Certain pairs of network elements (i.e. intermediate network elements and/or terminating devices) in the telecommunications network 100 may communicate with each other over network links. For example, terminating device 110 may communicate with intermediate network element 120 via the network link that connects the two entities. Each network link that connects entities in the telecommunications network 100 may include network links in radio access networks such as a Global System for Mobile Communications (GSM) network, a Universal Mobile Telecommunications System (UMTS) network, a Long Term Evolution (LTE) network, and a fixed wireless access network (such as IEEE 802.16 WiMax), wireless networks (such as IEEE 802.11 WiFi), and fixed data communications links as used in private and/or public networks such as the Internet. The network links in the telecommunications network may be at least partially provided by and/or maintained by a service provider of the telecommunications network 100.

One or more of the intermediate network elements 120-126 may communicate with an analysis system 130 via one or more network links (not shown). As is described in further detail below, the analysis system 130 may be configured to receive information relating to communications sessions from one or more intermediate network elements in order to conduct network link quality analysis. The analysis system 130 could for example include a computer server that includes hardware and/or software for receiving information relating to communications sessions, storing that information in an analysis system database 132, and processing the stored information in order to conduct network link quality analysis.

In the example telecommunications network of FIG. 1, a communications session could, for example, be conducted between terminating device 110 and terminating device 112 via the network links to which intermediate network elements 120, 122 and 124 are connected. Another communications session could for example be conducted between terminating device 114 and terminating device 116 via the network links to which intermediate network elements 126 and 122 are connected.

Figure 2:
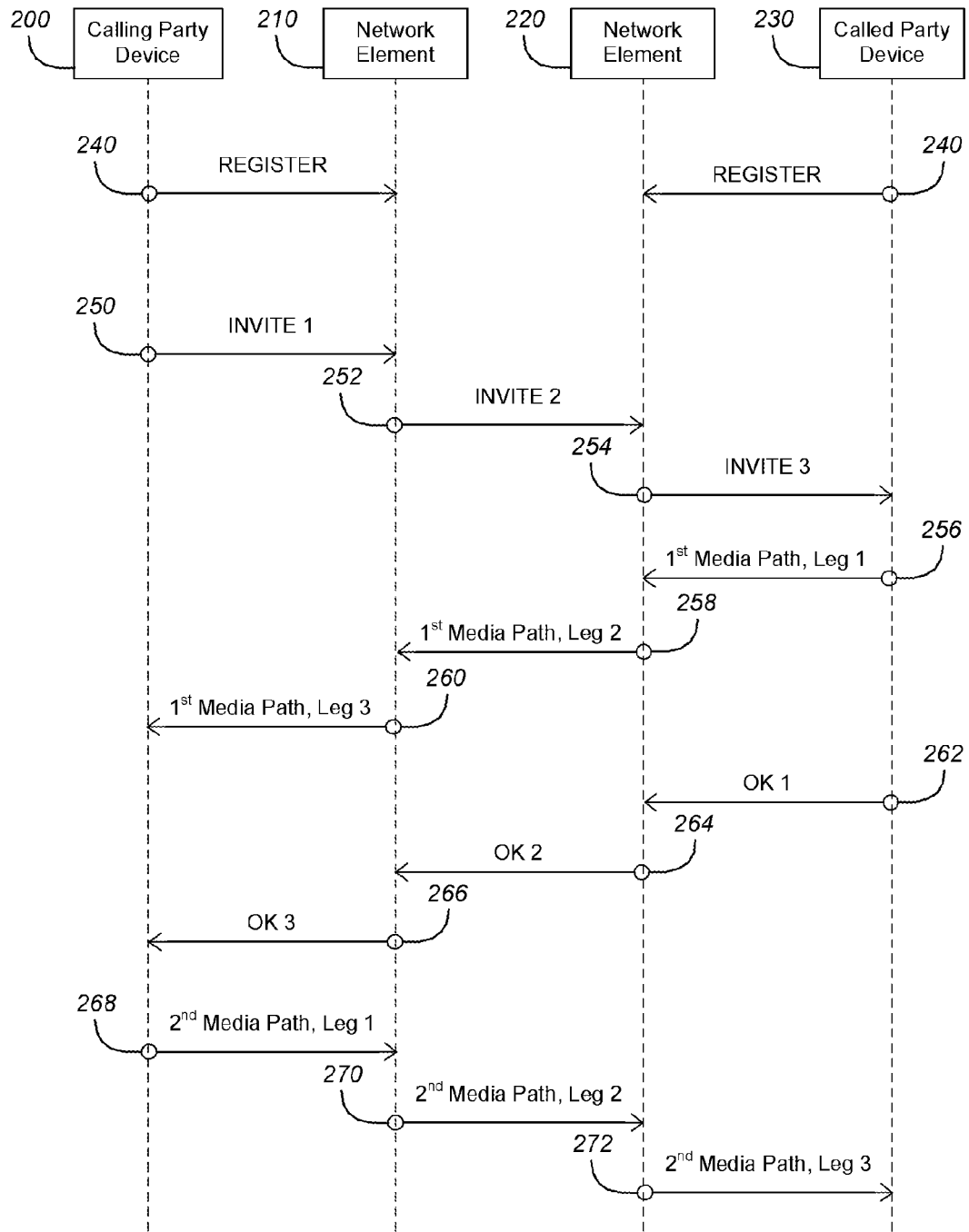
FIG. 2 illustrates steps performed in order to establish a communications session between two terminating devices, according to an embodiment of the invention.

FIG. 2 illustrates steps performed in order to establish a communications session between two terminating devices, i.e. a calling party device 200 and a called party device 230, using the Session Initiation Protocol (SIP) signaling procedure. In this example two media paths are established in the communications session, where the first media path is used to transmit media content from called party device 230 to calling party device 200, and the second media path is used to transmit media content from calling party device 200 to called party device 230. The two media paths may be conducted via the network links of the same set of network elements, or they may each be conducted via the network links of different sets of network elements.

Terminating devices 200 and 230 will initially register themselves with one or more network elements (step 240). A terminating device may register itself with the network element that the terminating device is connected to via a network link, for example calling party device 200 will register itself with network element 210, and called party device 230 will register itself with network element 220.

A terminating device 200, 230 may register itself with a network element by transmitting a SIP REGISTER request to that network element. Such a SIP REGISTER request contains a SIP address and a network location identifier. The SIP address may be used to identify the user of the terminating device, whilst the network location identifier of the terminating device may be used by a network element to communicate with the terminating device over a network link, e.g. it may be an Internet Protocol (IP) address.

Once a terminating device has registered itself with a network element, other terminating devices and/or network elements can locate that device by querying that network element for the network location identifier (e.g. IP address) of the terminating device on the basis of the SIP address associated with the user of the device. Communications sessions can then be conducted with the terminating device by communicating with it at the identified network location.

In the example of FIG. 2, the user of the calling party device 200 requests that a communications session be established with called party device 230. The user may indicate that called party device 230 should be the recipient of the communications session by entering or selecting the SIP address associated with the user of the called party device 230.

The calling party device 200 then requests to establish a communications session by initiating a first SIP session with network element 210. Terminating device 200 transmits a first SIP INVITE request to network element 210 (step 250). This first SIP INVITE request indicates that a communications session should be established with called party device 230 and includes a called party identifier that indicates the SIP address of the user of called party device 230.

On receipt of the first SIP INVITE request, network element 210 determines how to route the request to the called party identified in the first SIP INVITE request. In this case network element 210 establishes a second SIP session with network element 220 by sending a second SIP INVITE request to that network element (step 252). Network element 210 stores data indicating that the first SIP session is associated with the second SIP session.

Similarly, on receipt of the second SIP INVITE request, network element 220 determines how to route the request to the called party and thus establishes a third SIP session with the called party device 230 by sending a third SIP INVITE request to that terminating device (step 254). Network element 220 also stores data indicating that the second SIP session is associated with the third SIP session.

Each SIP INVITE request sent in steps 250 to 254 includes session description information that relates to how media should be transmitted to the entity sending the SIP INVITE when the first media path (used to transmit media from called party device 230 to calling party device 200) is established for the communications session. The session description information is formatted according to the Session Description Protocol (SDP) and includes a media format description specifying one or more types of media that the entity sending the SIP INVITE is capable of receiving (for the purposes of the first media path), and a media receiving address that specifies an IP address and port at which the entity sending the SIP INVITE expects to receive the media in the first media path.

On receipt of the third SIP INVITE request, called party device 230 may provide an indication to the user of that device that a request to establish a communications session has been received. Whilst waiting for the user to accept the request to establish a communications session, called party device 230 may establish a first leg for the first media path between called party device 230 and network element 220 (step 256). Called party device 230 does this by transmitting media content to the media receiving address received from network element 220 in the third SIP INVITE request.

Network element 220 establishes a second leg for the first media path between network element 220 and network element 210 (step 258). This could be done in response to receipt of the second SIP INVITE (i.e. of step 252), or in response to the establishment of the media path leg between called party device 230 and network element 220 in step 256. Network element 220 establishes the media path leg between it and network element 210 by transmitting media content to the media receiving address received from network element 210 in the second SIP INVITE request.

In a similar way to step 258, network element 210 establishes a third leg for the first media path between network element 210 and calling party device 200 (step 260).

The media path legs that are established in steps 256 to 260 thus form the first media path between called party device 230 and calling party device 200.

When the user of called party device 230 selects to accept the request for a communications session to be established, called party device 230 may send a first OK response to the third SIP INVITE request (step 262). Network element 220 will in response send a second OK response to network element 210, which will then in response send a third OK response to calling party device 200 (steps 264 and 266).

Each OK response will contain session description information that relates to how media should be transmitted to the entity sending the OK response when the second media path (used to transmit media from calling party device 200 to called party device 230) is established for the communications session. This session description information includes a media format description, and a media receiving address that specifies an IP address and port at which the entity sending the OK response expects to receive the media in the second media path.

In response to the receipt of the third OK response, calling party device 200 may establish a first leg for the second media path between calling party device 200 and network element 210 (step 268). Terminating device 200 does this by transmitting media content to the media receiving address received from network element 210 in the third OK response Network element 210 establishes a second leg for the second media path between network element 210 and network element 220 (step 270). This may be done in response to receipt of the second OK response (i.e. of step 264), or in response to the establishment of the media path leg between calling party device 200 and network element 210 in step 268. Network element 210 establishes the media path leg between it and network element 220 by transmitting media content to the media receiving address received from network element 220 in the second OK response.

In a similar way to step 270, network element 220 establishes a third leg for the second media path between network element 220 and called party device 230 (step 272).

The media path legs that are established in steps 268 to 272 thus form the second media path between calling party device 200 and called party device 230.

Once the first and second media paths have been established in accordance with the example steps of FIG. 2, media content can be transferred between terminating devices 200 and 230 so that the communications session can be conducted. In one embodiment of the invention the communications session is a voice call and so in the communications session of FIG. 2 the media content transmitted in the second media path relates to the speech of the caller at the calling party device 200, whilst the media content transmitted in the first media path relates to the speech of the called party at the called party device 230.

As summarized above embodiments of the invention, described in further detail below, allow network link quality to be assessed by an analysis system (e.g. 130) that processes communications session information received from a plurality of network elements in the communications network.

Figure 3:
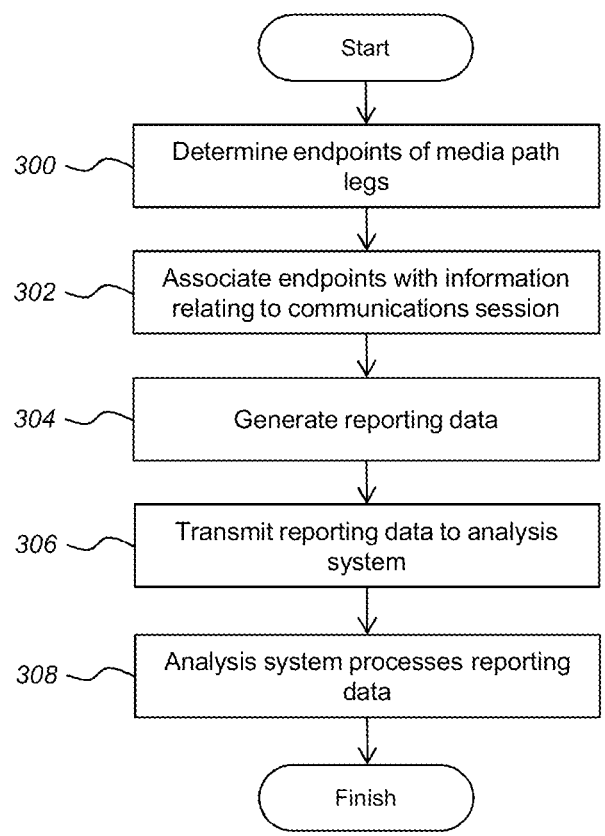
FIG. 3 illustrates the steps performed by a network element to derive information relating to a communications session, according to an embodiment of the invention.

In a first embodiment of the invention, a network element that acts as a SIP proxy, for example in accordance with the steps of FIG. 2 described above, is also configured to derive information relating to communications sessions for which it conducts SIP processing, and to transmit derived information to the analysis system of the telecommunications network. FIG. 3 illustrates the steps performed by a network element to derive information relating to a communications session and transmit derived information to an analysis system, in accordance with the first embodiment of the invention.

In the first embodiment, whilst conducting signaling procedures for a communications session, a network element is configured to gather information relating to each media path leg that the network element conducts signaling procedures in relation to for that communications session (step 300). In particular, the network element may determine the endpoints of each of those media path legs. The endpoints of a media path leg are the network elements and/or terminating devices that send and/or receive media via the media path leg.

In the communications session of FIG. 2, for example, network element 210 conducts processing in relation to the second and third legs of the first media path established in steps 258 and 260, respectively, and the first and second legs of the second media path established in steps 268 and 270, respectively.

Network element 210 receives information relating to each of these media path legs at different stages during the processing of the communications session, and may attempt to determine the endpoints of those media path legs from this information, as is now described.

Firstly, network element 210 can determine that it is itself an endpoint of each of these media path legs, as it will either be transmitting media content via the media path leg, as in the case of the third leg of the first media path (established in step 260) and the second leg of the second media path (established in step 270), or it will be receiving media content via the media path leg, as in the case of the second leg of the first media path (established in step 258) and the first leg of the second media path (established in step 268).

The other endpoints of the media path legs besides network element 210 are determined by network element 210 as follows.

In step 250, network element 210 receives the first SIP INVITE request from calling party device 200. The first SIP INVITE request includes session description information that includes the media receiving address at which calling party device 200 wishes to receive media content for the third leg of the first media path (which is established in step 260). Terminating device 200 is thus determined to be an endpoint of the third leg of the first media path from the media receiving address in this session description information.

In a similar way, in step 264 network element 210 receives the second OK response from network element 220. The second OK response includes session description information formatted according to the SDP protocol that includes the media receiving address at which network element 220 wishes to receive media for the second leg of the second media path. Network element 220 is thus determined to be an endpoint of the second leg of the second media path from the media receiving address in this session description information.

Hence, for the third leg of the first media path (established in step 260) and the second leg of the second media path (established in step 270), the endpoints besides network element 210 are determined by network element 210 using information it receives in the signaling procedures conducted to set up the communications session.

For the other two media path legs mentioned above, the endpoints are determined as follows.

In step 258, network element 210 receives media content from network element 220 via the second leg of the first media path. Network element 210 may examine the second leg of the first media path in order to determine the network element or terminating device that is transmitting the media content in that leg. For example, media content may be sent via the network link between network element 220 and network element 210 in data packets, and network element 210 may determine from these data packets that network element 220 is transmitting those data packets, e.g. from source IP address information contained in these data packets. Network element 220 is thus determined to be an endpoint of the second leg of the first media path from information received in the media path.

In a similar way, in step 268, network element 210 receives media content from calling party device 200 via the first leg of the second media path. Network element 210 may examine the first leg of the second media path in order to determine the network element or terminating device that is transmitting the media content in that leg. For example, media content may be sent via the network link between calling party device 200 and network element 210 in data packets, and network element may determine from these data packets that calling party device 200 is transmitting those data packets, e.g. from source IP address information contained in these data packets. Calling party device 200 is thus determined to be an endpoint of the first leg of the second media path from information received in the media path.

Once network element 210 has gathered the above information relating to the endpoints of the media path legs, it may associate those endpoints and media path legs with one or more characteristics of the communications session and record those one or more characteristics as data identifying those one or more characteristics, along with the endpoint information (step 302). One or more different identifiers of characteristics of the communications session may be associated with each endpoint and/or media path leg, as will now be described.

One recorded characteristic of the communications session may be a communications session identifier. Each communications session may have a unique identifier associated with it which is recorded by the network element 210. The unique identifier of a communications session may be created by a calling party device when attempting to initiate the communications session. The unique identifier may be transmitted in the signaling procedures conducted between the terminating devices and network elements involved in a communications session. For example the calling party device 200 may include the unique identifier as a SIP header in the first SIP INVITE request sent in step 250, and the unique identifier may also be included in the second and third SIP INVITE requests transmitted in steps 252 and 254.

Another recorded characteristic of the communications session may be one or more user addresses. The SIP address of the users of the terminating devices that initiate and/or receive the communications session may be transmitted in the signaling procedures conducted between the terminating devices and network elements involved in a communications session. For example the calling party device 200 may include its user's SIP address and that of the user of called party device 230 in the first SIP INVITE request sent in step 250, and these SIP addresses may also be included in the second and third SIP INVITE requests transmitted in steps 252 and 254, and recorded by the network element 210.

Another recorded characteristic of the communications session may be a signaling procedure identifier. Each signaling procedure conducted between terminating devices and/or network elements may have a unique identifier associated with it, which is recorded by the network element 210. Each of these unique identifiers may be created by the terminating device or network element initiating the signaling procedure, and may be transmitted between the devices involved in a respective signaling procedure. Thus each SIP session (i.e. signaling procedure) in FIG. 2 may have a unique identifier associated with it. For example, calling party device 200 may include in the first SIP INVITE request of step 250 the unique identifier for the SIP session between it and network device 210. Similarly, network element 210 may include in the second SIP INVITE request of step 252 the unique identifier for the SIP session between it and network device 220, etc.

Another recorded characteristic of the communications session may be a media path leg identifier. Each media path leg may have a unique identifier associated with it, which is recorded by the network element 210. Each of these unique identifiers may be created by the terminating device or network element initiating the media path leg, and may be transmitted between the devices involved in that media path leg. For example, calling party device 200 may transmit in the first leg of the second media path request of step 268 the unique identifier for that leg between it and network device 210. Similarly, network element 210 may include in the second leg of the second media path of step 270 the unique identifier for that leg between it and network device 220, etc.

Another recorded characteristic of the communications session may be a media path leg endpoint identifier. Each media path leg endpoint may have a unique identifier associated with it, which is recorded by the network element 210. The unique identifier could be a network address of the media path leg endpoint, such as the Internet Protocol (IP) address of the media path leg endpoint within a network link. If the media path leg endpoint has more than one network address (e.g. a different IP address in each different network link that the endpoint is connected to) then each of these network addresses may be associated with the media path leg, if they are known to network element 210.

Another recorded characteristic of the communications session may be a time indicator. Each communications session, signaling procedure, and/or media path leg may be associated with one or more indications of time relating to when the communications session occurred, which are recorded by the network element 210. For example, network element 210 may associate the communications session, signaling procedures between it and calling party device 200 and/or network element 220, and/or media path legs between it and calling party device 200 and/or network element 220, with one or more times such as the start time and/or end time of the communications session, signaling procedure and/or media path leg.

Once network element 210 has recorded data identifying the endpoints of the media path legs along with one or more of the above identifying characteristics of the communications session it generates reporting data that contains information corresponding to the recorded data identifying the endpoints and the communications session identifying characteristics (step 304).

The network element 210 may aggregate all the identifying characteristics it determines and records in relation to a communications session, such as the media path endpoints it is aware of, the communications session identifier, signaling procedure identifiers, media path leg identifiers, media path endpoint identifiers, and/or time indicators, into a single communications session report. In order to do this the network element 210 may be configured to associate each of the media path legs it is aware of with each of the media path leg identifiers, signaling procedure identifiers, communications session identifier, etc., i.e. the network element 210 itself determines that these all relate to the same communications session. Alternatively it may report at least some of the data separately without such determination.

Once reporting data has been generated by the network element, it is transmitted to the analysis system using the telecommunications network (step 306).

The analysis system of the telecommunications network will thus receive one or more communications session reports in relation to a communications session conducted in the telecommunications network. For example, as a result of the communications session of FIG. 2, the analysis system may receive a communications session report from one network element 210 and another such report from another network element 220.

The analysis system is configured to process the reporting data it receives in these communications session reports in order to determine the network links and entities involved in the two media paths of the communications session (step 308). In order to do this, the analysis system correlates the communications session reports it receives in order to determine that they relate to the same communications session. The analysis system may do this on the basis of matches between one or more of the identifying characteristics of a communications session contained in each communications session report it receives. Several examples of the matches that may be made follow.

The analysis system may correlate the communications session reports if they contain the same unique communications session identifying characteristic.

The analysis system may correlate the communications session reports if they contain the same unique signaling procedure identifying characteristic. For example, the communications session report from network element 210 and the communications session report from network element 220 may both contain the unique signaling procedure identifier for the signaling procedure (e.g. SIP session) conducted between those two network elements.

The analysis system may correlate the communications session reports if they contain one or more indications of time relating to when the communications session occurred that match. For example, the communications session report from network element 210 and the communications session report from network element 220 may both contain time indicators that indicate that the communications session they relate to took place at substantially the same time.

The analysis system may correlate the communications session reports if they contain the same media path leg identifying characteristic. For example, the communications session report from network element 210 and the communications session report from network element 220 may both contain the media path leg identifier for the first media path leg of the first media path conducted between those two network elements. The media path leg identifier could for example be the synchronization source identifier (SSRC) that identifies the source of the media content for the RTP session for a media path leg.

The analysis system may also, or alternatively, correlate the communications session reports if they contain matching media path legs and/or endpoints. For example, the communications session report from network element 210 and the communications session report from network element 220 may both contain network addresses of the endpoints of the second leg of the first media path (i.e. the one established in step 258). The analysis system may also correlate the communications session reports if they contain matching SIP addresses for the terminating devices of the communications session.

When correlating communications session reports on the basis of the identifiers described above, the analysis system may match two or more identifying characteristics relating to the communications session in order to ensure the communications session reports relate to the same communications session, for example by matching communications session reports if they contain matching SIP addresses and one or more indications of time relating to when the communications session occurred. In another example correlation may be done by matching communications session reports if they contain the same media path leg identifying characteristic and one or more indications of time relating to when the communications session occurred. In another example correlation may be done by matching communications session reports if they contain matching media path legs and/or endpoints and one or more indications of time relating to when the communications session occurred.

FIG. 9 illustrates a table of information contained in three example reports (numbered report 1, 2 and 3) received by the analysis system, exemplifying the identifying characteristics the analysis system may attempt to match for a communications session in the first embodiment of the invention. For these three reports, the analysis system may determine that report numbers 1 and 3 relate to the same communications session as they both relate to a communications session between with the same caller and called party identifiers, and as they both relate to a communications session conducted over a matching time period (as indicated by the call start and end times). Similarly, the analysis system may also determine that report numbers 2 and 3 relate to the same communications session as they both contain the same communications session identifier cID1. The analysis system may thus aggregate the information in the three reports, even though they do not individually contain complete identifying fields of data as it has determined that the reports relate to the same communications session.

By correlating the one or more communications session reports that it receives in relation to a communications session, the analysis system is able to determine the one or media path legs and/or media path leg endpoints of the one or more media paths of a communications session. The analysis system is configured to do this for a plurality of communications sessions and store information relating to the media paths, media path legs and endpoints of each communications sessions in an analysis system database.

The analysis system is also configured to correlate the information it stores in relation to the media paths, media path legs and endpoints of each communications session with quality of service information it receives from devices in the telecommunications network in order to assess network link quality, as will now be described.

In the first embodiment of the invention, network elements may also be configured to determine Quality of Service (QoS) information relating to communications sessions conducted in the telecommunications network and report this information to the analysis system.

Quality of service information (QoS) may be generated by the terminating devices involved in a communications session and transmitted between those terminating devices and the network elements involved in the communications session. Each terminating device that receives media content via a media path of a communications session may generate QoS information in relation to that media path.

The QoS information generated in relation to a media path may be transmitted along a media control path relating to the media path between the terminating devices of the communications session. The media control path relating to a media path may be established when the media path is established, and may be comprised of the same number of legs as the media path it is related to.

For example, where a media path is comprised of a number of legs between respective pairs of terminating devices and/or network elements, with each leg in the media path using the Real Time Protocol (RTP), the media control path may be comprised of the same number of legs between the same pairs of terminating devices and/or network elements, with each leg in the media control path using the Real Time Control Protocol (RTCP), as is known in the prior art.

QoS information relating to a media path is generated by the terminating device that receives media content in that media path and transmitted back to the terminating device that sent that content via the media control path associated with that media path. For example, in FIG. 2 a first media control path relating to the second media path is established between called party device 230 and calling party device 200, and QoS information is transmitted from the called party device 230 to the calling party device 200 between the endpoints of each of the legs of the first media control path.

A terminating device that receives media content via a media path may regularly generate and transmit messages containing QoS information relating to that media content via the corresponding media control path. Each message containing QoS information may include one or more measures of jitter, delay and/or data packet loss that the terminating device has detected in the media content it has received since it last generated and transmitted a portion of QoS information.

Network elements that perform processing of media in a communications session may monitor the messages containing QoS information that are transmitted via the media control path of the communications session. The portions of QoS information monitored by a network element may be aggregated over the duration of the communications session in order to determine overall QoS information relating to the media paths of the communications session.

The overall QoS information relating to a media path of a communications session that is determined by a network element may be included in the single communications session report relating to that communications session that the network element generates (e.g. in accordance with step 304 of FIG. 3).

The overall QoS information relating to a media path of a communications session is thus associated with the identifying characteristics of the communications session determined by a network element (e.g. in accordance with step 302 of FIG. 3), such as the media path endpoints the network element is aware of, the communications session identifier, signaling procedure identifiers, media path leg identifiers, and/or time indicators, etc.

The analysis system of the telecommunications network will thus receive and process one or more communications session reports in relation to a communications session conducted in the telecommunications network, as described in steps 306 and 308 above.

These communications session reports will include the QoS information relating to the media paths of the communications session. When processing these communications session reports in step 308, the analysis may thus associate the one or media path legs and/or media path leg endpoints of the one or more media paths of a communications session with the corresponding QoS information received in these communications session reports.

In this way, the analysis system is able to associate the actual network links involved in a communications sessions with QoS information relating to that communications session.

The analysis system is configured to do this for a plurality of communications sessions, such that the actual network links used in each of the plurality of communications sessions and their corresponding QoS information.

For each network element (i.e. for each intermediate network element and each terminating device) in the telecommunications network, the analysis system may aggregate the QoS information for each of the media paths that the network element has been associated with, and store the aggregated information in the analysis system database.

The analysis system may then conduct network link quality analysis by examining the aggregated QoS information for each network link. For example, if a large proportion of the media paths established via network links associated with a network element exhibited poor QoS, that network element may be detected as a potential source of a QoS issue in the telecommunications network. The network element may thus be highlighted in an electronic report sent to service personnel of the telecommunications network by the analysis system, in order to assist in the detection and isolation of QoS issues in the telecommunications network.

In an alternative arrangement of the first embodiment of the invention, the terminating devices and network elements involved in a communications session such as the example communications session shown in FIG. 2 may be configured to use a media path for the second media path (e.g. between called party device 230 and the calling device 200) that is symmetric to the one used for the first media path (e.g. between calling device 200 and called device 230).

In this case the first leg of the second media path (established in step 268) may be established between the same devices as, but in the opposite direction to, the third leg of the first media path (established in step 260). Similarly, this may also apply to the second leg of the second media path and the second leg of the first media path, as well as to the third leg of the second media path and the first leg of the first media path.

When determining the endpoints of media path legs, network element 210 may therefore assume that the first media path and the second media path are symmetric. For example, to determine the endpoints of the second leg of the first media path, network element 210 may use the signaling information it receives in step 264 in relation to second leg of the second media path, as network element 210 may determine that these two media path legs relate to the same communications session and are symmetrical. Similarly, to determine the endpoints of the first leg of the second media path, network element 210 may use the signaling information it receives in step 20 in relation to first leg of the first media path, as network element 210 may determine that these two media path legs relate to the same communications session and are symmetrical.

As a result, this arrangement allows media path legs to be determined solely from the signaling procedures conducted for a telecommunications session in the telecommunications network.

A second embodiment of the invention will now be described. In the second embodiment, a network element acting as a SIP proxy and/or performing other functions in relation to a communications session may be separated into two or more network elements that each perform some of the actions performed by a network element in FIGS. 1 to 3, rather than these being performed by only one network element, as in the first embodiment of the invention.

Figure 4:
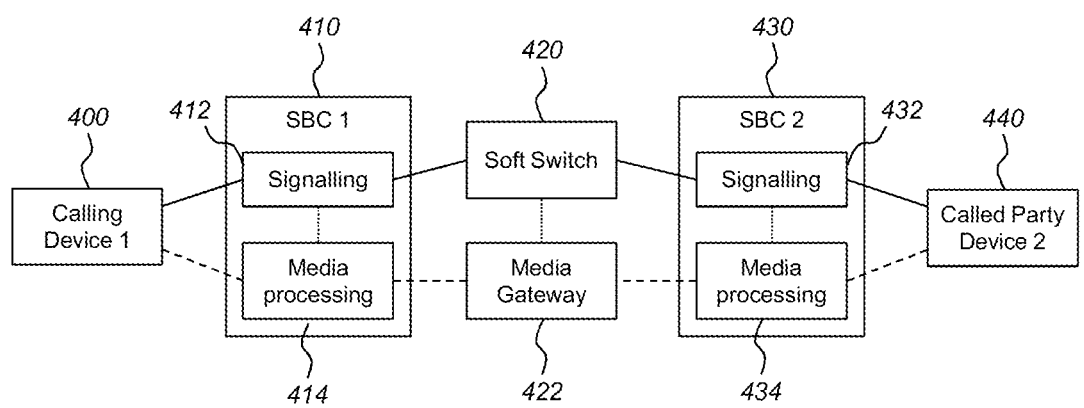
FIG. 4 schematically illustrates terminating devices and network elements involved in an example communications session, according to an embodiment of the invention.

FIG. 4 schematically illustrates the terminating devices and network elements involved in an example communications session according to the second embodiment of the invention.

In FIG. 4, a communications session is established between calling party device 400 and called party device 440. A first session border controller (SBC) 410, softswitch 420, media gateway 422, and a second session border controller (SBC) 430 conduct processing in relation to the communications session.

SBC 410 and SBC 430 are each comprised of a signaling component, 412 and 432 respectively, and a media processing component, 414 and 434 respectively. The signaling component of each SBC is configured to conduct signaling procedures (e.g. SIP sessions etc.) in relation to the communications session, whilst the media processing component of each SBC is configured to conduct media transfer procedures (e.g. media paths etc.) in relation to the communications session. Each component of each SBC may reside on a different element of the telecommunications network, e.g. signaling component 412 may reside on a first computer server, media processing component 414 may reside on a second computer server, etc. In conjunction, the signaling component and media processing component of an SBC (e.g. 410) performs the actions of a network element as described above and in illustrated in FIGS. 1 to 3.

Similarly, softswitch 420 is configured to conduct signaling procedures in relation to the communications session, whilst media gateway 422 is configured to conduct media transfer procedures in relation to the communications session. In conjunction, the softswitch 420 and media gateway 422 perform the actions of a network element as described above and in illustrated in FIGS. 1 to 3.

The signaling components of each SBC 410, 430 may communicate with their corresponding media processing component by using a gateway control protocol such as ITU-T Recommendation H.248.1). Softswitch 420 may also communicate with media gateway 422 using a gateway control protocol such as H.248.1. In FIG. 4, the SIP sessions established between the terminating devices and the network elements involved in conducting signaling procedures (i.e. signaling components 412 and 432, and softswitch 420) are indicated by a solid line, whilst the media path legs of a media path established between the terminating devices and the network elements involved in conducting media transfer procedures (i.e. media processing components 414 and 434, and media gateway 422) are indicated by a dashed line.

In the second embodiment of the invention, the signaling components 412 and 432 of the SBCs 410 and 430 may determine from session description information one or more media path leg endpoints, as described in step 300 of FIG. 3. In addition or in the alternative, the media processing components 414 and 434 of the SBCs 410 and 430 may examine the media path legs in relation to which they conduct processing in order to identify one or more media path leg endpoints.

In order for the signaling component 412 to gather information relating to the media path leg endpoints determined by media processing component 414, information relating to the communications session and to the media path leg endpoints is transmitted between the signaling component 412 and the media processing component 414 using a gateway control protocol (e.g. H.248.1).

Thus, for the example communications session of FIG. 4, signaling component 412 has access to the information relating to the media path, information relating to the endpoints of the media path legs and information relating to the communications session. The signaling component 412 thus generates reporting data containing this information and transmits this reporting data to an analysis system in accordance with steps 304 and 306 of FIG. 3.

In a similar way, information relating to the communications session and to the media path leg endpoints may be transferred between softswitch 420 and media gateway 422, and between the signaling component 432 and the media processing component 434, so that softswitch 420 and signaling component 432 may each generate and transmit respective reporting data to an analysis system.

The analysis system may thus use information relating to the communications session when conducting network link quality analysis in accordance with the methods described in relation to the first embodiment of the invention. As a result, network link quality issues that may relate to media processing components 414 and/or 434 and/or media gateway may be detected by the analysis system.

The second embodiment of the invention may otherwise operate according to the methods described in relation to the first embodiment of the invention.

A third embodiment of the invention will now be described. In the third embodiment, a network element that is, for example, operating as an SBC, may be configured to detect that a calling party device located behind another network element that is, for example, operating as a network address translator (NAT), is an endpoint of a media path leg which the network element is processing. The SBC may be configured to report to an analysis system that both the calling party device and the NAT are present on the media path leg, so that this information can be used by the analysis system in analyzing network link quality.

Figure 5:
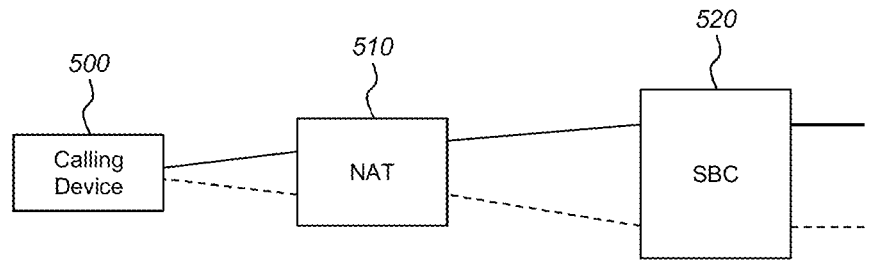
FIG. 5 schematically illustrates a terminating device and network elements involved in part of an example communications session, according to an embodiment of the invention.

FIG. 5 schematically illustrates a terminating device and network elements involved in part of an example communications session according to the third embodiment of the invention.

In FIG. 5, a communications session is established between calling party device 400 and a called party device (not shown). SBC 520 conducts processing in relation to the communications session and is initially contacted by the calling party device 500 when the calling party device 500 attempts to initiate the communications session (e.g. by transmitting a first SIP INVITE request). Two media paths are set up in the example of FIG. 5: a first media path for transmitting media content from the calling party device 500 to the called party device, and a second media path for transmitting media content from the called party device to the calling party device 500.

A network address translator (NAT) 510 is located on the network link between the calling party device 500 and the SBC 520. The network address translator is configured to over-write the source and/or destination addresses of data packets that pass through it, in order to obscure the structure of the network containing the calling party device 500 from the network containing the SBC 520.

Thus, when a first signaling session (indicated by the solid line in FIG. 5) is established for the communications session between calling party device 500 and SBC 520, data packets relating to the first signaling session received by the SBC 520 will appear to have been transmitted by the NAT 510, rather than the calling party device 500.

Similarly, when the first media path from the calling party device 500 to the called party device is established, data packets received via the first media path leg from calling party device 500 by SBC 520 will appear to have been transmitted by the NAT 510, rather than the calling party device 500.

Thus, when SBC 520 gathers information relating to each media path leg that it is conducting processing in relation to for the communications session, it must employ an alternative mechanism to that of step 300 of the first embodiment of the invention for detecting the presence of both calling party device 500 and NAT 510.

Where a NAT is deployed on the network link between a calling party device and a network element such as an SBC, as in FIG. 5, communications sessions initiated by the calling party device must be established using a NAT traversal technique, as otherwise media content that is transmitted to the calling party device may not be able to traverse the NAT.

In this example, the 'latching' NAT traversal technique (ITU-T Recommendation H.248.37) is used to illustrate the features of the third embodiment of the invention. In the latching NAT traversal technique, the calling party device 500 uses the same IP port to send media content via the first media path as it does to receive media content via the second media path.

Figure 6:
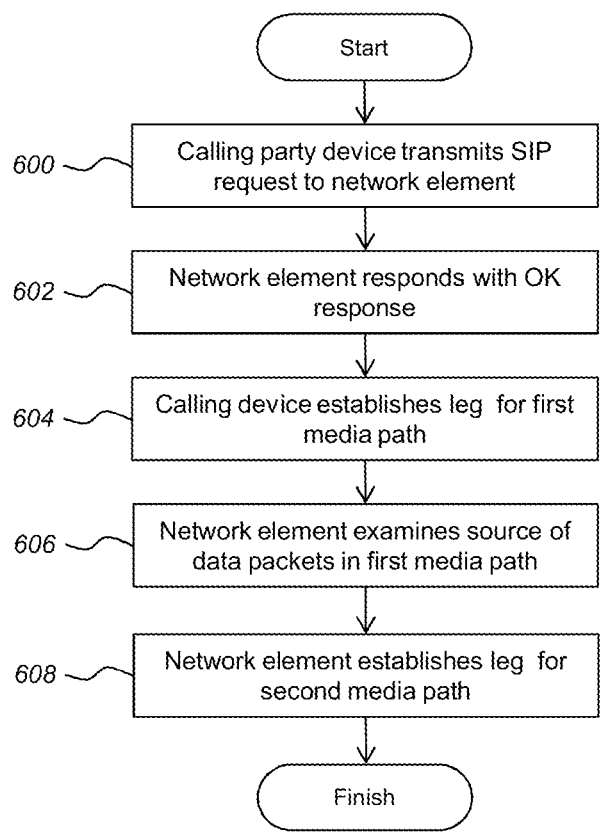
FIG. 6 illustrates the steps performed to set up media path legs between the terminating device and network element of FIG. 5, according to an embodiment of the invention.

FIG. 6 illustrates the steps performed to set up the media path legs between the calling party device 500 and SBC 520 for the first and second media paths in this example.

The calling party device 500 uses signaling procedures to initiate the communications session, e.g. by transmitting a SIP INVITE request to calling party device 500 (step 600). In the SIP INVITE request that calling party device 500 sends to SBC 520, the session description information indicates that media content in the second media path should be transmitted by SBC 520 to the IP address of calling party device 500, at a first port number, e.g. to the address 192.168.0.10:40000, where 192.168.0.10 is the IP address of the calling party device and 40000 is the first port number.

SBC 520 will later respond to the SIP INVITE request sent by calling party device 500 with an OK response (step 602). This OK response contains session description information that indicates that media content in the first media path should be transmitted by calling party device 500 to the IP address of SBC 520, at a second port number, e.g. to the address 192.168.20.30:50000, where 192.168.20.30 is the IP address of the SBC 520 and 50000 is the second port number.

Calling party device 500 may then establish a leg between itself and SBC 520 for the first media path, by transmitting media content to the address specified in the session description information in the OK response (step 604).

Calling party device 500 chooses to transmit the media content from the same port that it specified in the session description information in the SIP INVITE request it sent to SBC 520, e.g. from address 192.168.0.10:40000.

Once data packets carrying media content for the first media path pass through the NAT 510, e.g. from address 192.168.0.10:40000 (the calling party device 500) to address 192.168.20.30:50000 (the SBC 520, the NAT 510 will also allow data packets to pass through in the opposite direction.

SBC 520 may then receive the data packets carrying media content for the first media path and examine the source address of these data packets (step 606). Due to the NAT 510, these data packets will appear to have been transmitted from an address at the NAT, rather than the address at the calling party device 500.

SBC 520 may thus establish a leg between itself and calling party device 500 for the second media path (step 608), by transmitting media content to the source address specified in the data packets carrying media content for the first media path (i.e. the address of the NAT 510). When the NAT 510 receives data packets from SBC 520 at this address, it will forward them back to the calling party device (e.g. to address 192.168.0.10:40000).

In the process of the steps of FIG. 6, SBC 520 gathers information relating to the legs between itself and calling party device 500 for the first and second media path, as is now described.

SBC 520 determines that calling party device 500 is an endpoint of the leg of the second media path from the session description information received in the SIP INVITE request in steps 600.

SBC 520 determines that NAT 510 lies on the leg of the first media path when it receives data packets for the first media path from the NAT 510 in step 604 and examines those packets in step 606. Also, SBC 520 may assume that calling party device 500 is an endpoint of the first media path.

SBC 520 thus determines that it must transmit data packets for the second media path to NAT 510 in order to reach calling party device 500, and hence that NAT 510 lies on the leg of the second media path.

SBC 520 may then associate the endpoints and media path legs it has detected with information relating to the communications session that it has determined in accordance with step 302 of the first embodiment. The SBC 520 will also associate the information indicating that the NAT lies on the legs of the first and second media paths between calling party device 500 and SBC 520 with the information relating to the communications session, and include information relating to the NAT in reporting data it generates and transmits in accordance with steps 304 and 306 of the first embodiment of the invention. The analysis system may thus use information relating to the NAT 510 when conducting network link quality analysis in accordance with the methods described in relation to the first embodiment of the invention. As a result, network link quality issues that may relate to the NAT 510 and/or calling party device 500 may be detected by the analysis system.

The third embodiment of the invention may otherwise operate in accordance with methods described in relation to the first embodiment of the invention.

In an alternative arrangement of the third embodiment of the invention, a different NAT traversal technique may be used by the terminating device 500 and/or SBC 520. The NAT traversal technique used could include one or more of Session Traversal Utilities for NAT (STUN, see e.g. IETF RFC 5389), Traversal Using Relay NAT (TURN, see e.g. IETF RFC 5766), Interactive Connectivity Establishment (ICE, see e.g. IETF RFC 5245), and/or an application-level gateway for SIP included in the NAT 510.

Depending on the NAT traversal technique used, one or more of the terminating device 500, NAT 510, SBC 520 and/or a server (see examples below) may need to gather information relating to at least some of the media path leg endpoints of a communications session in order to allow the analysis system to use information relating to both the terminating device and NAT when conducting network link quality analysis.

In one example of this arrangement where STUN is used as the NAT traversal technique, a STUN server may be located on the other side of the NAT 510 to terminating device 500 (i.e. such that the STUN server is on the same side of the NAT 510 as the SBC 520). By communicating with the STUN server, terminating device 500 is able to determine an address of the NAT 510 that the SBC 520 may use to transmit media content to the terminating device 500. This address of the NAT 510 may then be included in the session description information of the SIP INVITE request transmitted by the terminating device 500 when initiating a communications session. SBC 520 may therefore not be able to determine that terminating device 500 is an endpoint of the media path legs between itself and terminating device 500 from the session description, as only NAT 510 would appear to be an endpoint. Instead, terminating device 500 and/or the STUN server could transmit this information to the analysis system.

In another example of this arrangement where TURN is used as the NAT traversal technique, a TURN server may be located on the other side of the NAT 510 to terminating device 500 (i.e. such that the TURN server is on the same side of the NAT 510 as the SBC 520). The TURN server may be used to relay media content to and/or from the terminating device 500, despite the presence of the NAT 510, using a connection between the terminating device 500 and TURN server that are set up using the TURN protocol. In this example, terminating device 500 and/or the TURN server could transmit information relating to the media path leg (or legs) between the terminating device 500 and TURN server and the endpoints of that media path (including the presence of NAT 510), to the analysis system.

In another example of this arrangement where ICE is used as the NAT traversal technique, a STUN or TURN server may be used in accordance with the examples above, depending on the topology of the network link between the terminating device 500 and SBC 520 via the NAT 510.

In another example of this arrangement where an application-level gateway for SIP is included in the NAT 510, the NAT 510 may be configured to monitor signaling procedures conducted between terminating device 500 and SBC 520 via the NAT 510, and in response to this monitoring allow the establishment of media path legs between terminating device 500 and SBC 520 via the NAT 510. In this example, NAT 510 could transmit information relating to the media path leg (or legs) between the terminating device 500 and SBC 520 and the endpoints of that media path (including the presence of NAT 510), to the analysis system.

A fourth embodiment of the invention will now be described. In the fourth embodiment, one or more network elements in a media path of a communications session may be determined during a resource reservation procedure. The resource reservation procedure may be conducted before, or when, the communications session is established in order to reserve resources for the media path in one or more network links in the telecommunications network. The one or more network links for which resources are reserved may form part of an access network that connects the calling party device to a service provider network.

Figure 7:
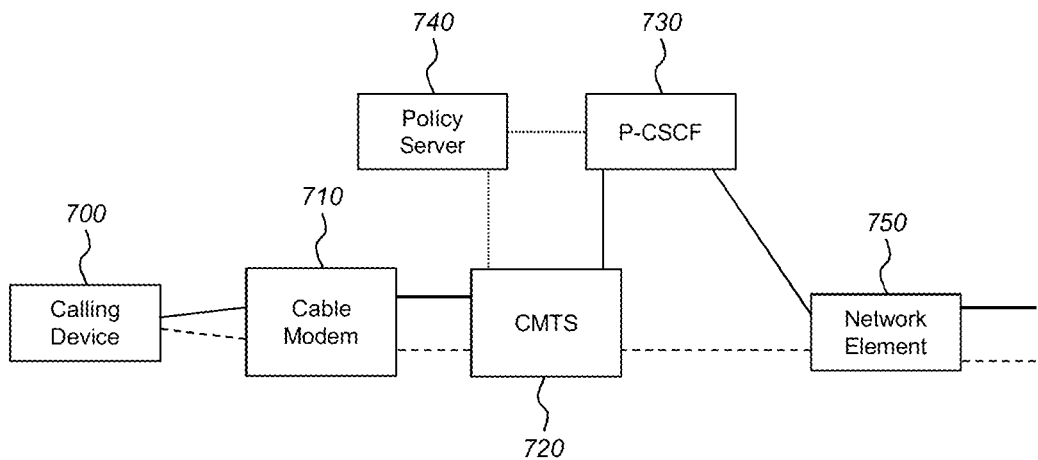
FIG. 7 schematically illustrates a terminating device and components involved in part of an example communications session, according an embodiment of the invention.

FIG. 7 schematically illustrates a terminating device and components in an access network and a service provider network involved in part of an example communications session according to the fourth embodiment of the invention.

In FIG. 7, a communications session is established between calling party device 700 and a called party device (not shown). An access network including a cable modem 710 and cable modem termination system (CMTS) 720 connects the calling party device 700 to a service provider network that includes a Proxy Call Session Control Function (P-CSCF) 730, policy server 740 and a network element 750. One media path is set up in the example communications session of FIG. 7, from the calling party device 700 to the called party device, via the cable modem 710, CMTS 720 and network element 750. The CMTS is one of a plurality of cable modem termination systems in the service provider network of the communications network.

In the example of FIG. 7, the cable modem 710 and CMTS 720 may communicate with each other as described by the Data Over Cable Service Interface Specification (DOCSIS) standard. In order to enable communications sessions to be conducted over the access network, the PacketCable extensions to the DOCSIS specification may be used.

Figure 8:
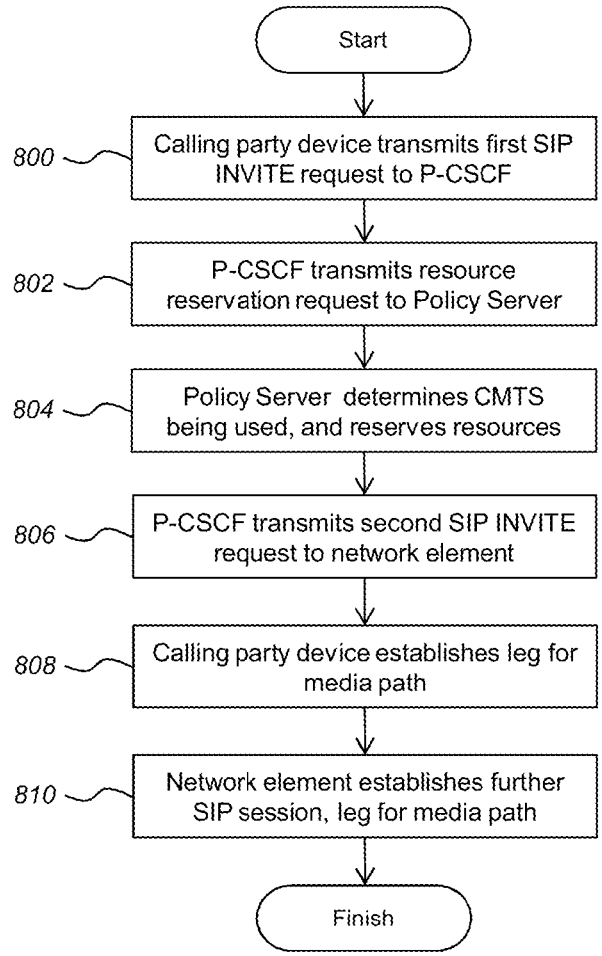
FIG. 8 illustrates the steps performed to set up a media path leg between the terminating device and network element of FIG. 7, according to an embodiment of the invention.

FIG. 8 illustrates the steps performed to set up a media path leg between the calling party device 700 and network element 750 for the media path in this example.

Calling party device uses signaling procedures to initiate a communications session, e.g. by transmitting a first SIP INVITE request to P-CSCF 730 via the cable modem 710 and CMTS 720 (step 800). The first SIP INVITE request is used to establish a first SIP session between calling party device 700 and P-CSCF 730.

In response to receiving the first SIP INVITE, P-CSCF 730 conducts a resource reservation procedure in order to reserve resources in the access network for the media path that is to be established for the communications session. The resource reservation procedure includes the P-CSCF 730 transmitting a resource reservation request to the policy server 740 (step 802). The resource reservation request includes information identifying the calling party device 700 (e.g. an IP address) and may include information relating to the media path to be established.

In response to receiving the resource reservation request, the policy server 740 determines which CMTS of the plurality of cable modem termination systems in the service provider network is being used in conjunction with the cable modem 710 to provide the calling party device 700 with access to the service provider network (step 804). The policy server may use a CMTS discovery procedure such as the Control Point Discovery Interface of the PacketCable specification in order to determine the correct CMTS from the plurality of cable modem termination devices. The policy server 740 may then query the determined CMTS (i.e. CMTS 720) in order to determine whether that CMTS can reserve the required resources (e.g. access network bandwidth) for the media path. The required resources may be reserved in order to provide a desired level of Quality of Service for the media path.

Once the policy server 740 has determined that the CMTS 720 can reserve the required resources for the media path, it transmits a resource reservation success message to P-CSCF 730.

P-CSCF 730 then transmits a second SIP INVITE request to network element 750 in order to establish a second SIP session between itself and network element 750 (step 806).

Network element 750 responds to the second SIP INVITE request by transmitting a first OK response to P-CSCF 730 containing session description information for the leg of the media path to be established for the communications session. This session description indicates the address at which network element 750 wishes to receive media content for the media path to be established for the communications session.

P-CSCF 730 then responds to the first OK response by transmitting a second OK response to calling party device 700 containing the same session description information as was contained in the first OK response.

Calling party device 700 then establishes a media path leg between it and network element 750 by transmitting media content to the address specified in the session description information received in the second OK response (step 808).

Network element 750 also establishes a further SIP session and a second media path leg with a further network element or the called party device, in order to establish the communications session, in accordance with the first embodiment of the invention (step 810).

In the process of the steps of FIG. 8, policy server 740 gathers information relating to the media path leg between calling party device 700 and network element 750, as is now described.

Policy server 740 determines that CMTS 720 is being used to provide access to the service provider network for the calling party device 700, and that the media path for the communications session will thus pass through CMTS 720, in step 804. The policy server 740 may thus determine that CMTS 720 lies in the media path leg between calling party device 700 and network element 750.

Policy server 740 transmits information indicating that CMTS 720 lies in this media path leg to P-CSCF 750. P-CSCF 750 may then associate the information relating to the CMTS 720 with information relating to the communications session that it has determined in accordance with step 302 of the first embodiment, and includes information relating to the CMTS 720 in reporting data it generates and transmits in accordance with steps 304 and 306 of the first embodiment of the invention. The analysis system may thus use the information relating to the CMTS 720 when conducting network link quality analysis in accordance with the first embodiment of the invention. As a result, network link quality issues that may relate to the CMTS 720 may be detected by the analysis system.

Note that network element 720 may also determine information in relation to the media path leg between calling party device 700 and itself and may transmit this information to the analysis system in a report in accordance with steps 300 to 306 of FIG. 3.

The fourth embodiment of the invention may otherwise operate in accordance with the methods described in relation to the first embodiment of the invention.

In an alternative arrangement of the fourth embodiment of the invention, the access network may operate according to an alternative standard to DOCSIS. The access network could instead operate in accordance with the Telecoms and Internet converged Services and Protocols for Advanced Networks specification (TISPAN), or alternatively in accordance with the Evolved Packet System (EPS) of the $3^{rd}$ Generation Partnership Project (3GPP). In each case, a resource reservation procedure may be conducted in the access network and/or the service provider network. The resource reservation procedure may be conducted in order to provide a desired level of Quality of Service for media paths established by the communications session.

In one example of this arrangement where the access network may operate according to TISPAN, the terminating device 700 may conduct signaling procedures (e.g. a first SIP session) with a Proxy Call Session Control Function (P-CSCF) in order to initiate a communications session. The P-CSCF communicates with a Service-based Policy Decision Function (SPDF) in order to request resource reservation for the communications session, and the SPDF then forwards the P-CSCF resource reservation requests to an appropriate core border gateway function (C-BGF) and/or access resource admission control function (A-RACF) for the communications session. Based on the response the SPDF receives from the C-BGF or A-RACF, it can inform the P-CSCF that the resource reservation was successful. A media path leg may then be established between the terminating device and the C-BGF. In this example, the SPDF and/or P-CSCF may transmit information relating to the media path leg (or legs) between the terminating device and C-BGF and the endpoints of that media path to the analysis system.

In another example of this arrangement, the access network may operate according to the Evolved Packet System (EPS) of the $3^{rd}$ Generation Partnership Project (3GPP). In this case the terminating device 700 may conduct signaling procedures (e.g. a first SIP session) with a Proxy Call Session Control Function (P-CSCF) in order to initiate a communications session. The P-CSCF communicates with a Policy Control and Charging Rules Function (PCRF) in order to request resource reservation for the communications session, and the PCRF then forwards the P-CSCF resource reservation requests to an appropriate Portable Data Network Gateway (PDN-GW) for the communications session. Based on the response the PCRF receives from the PDN-GW, it can inform the P-CSCF that the resource reservation was successful. A media path leg may then be established between the terminating device and the PDN-GW. In this example, the PCRF and/or P-CSCF could transmit information relating to the media path leg (or legs) between the terminating device and PDN-GW and the endpoints of that media path to the analysis system.

Various measures (for example, a method for and a network element for use in) monitoring network link quality in a telecommunications network are provided. The telecommunications network includes a plurality of intermediate network elements connected to network links via which communications sessions are conducted between respective terminating devices. A communications session comprises signaling procedures relating to the control of the communications session and media transfer procedures for transmitting media content via a media path established using at least part of the signaling procedures. The established media path includes media path legs which are each established between respective media path leg endpoints connected via a network link. One or more endpoints of a media path leg are determined from at least part of the signaling procedures. The determined one or more endpoints include a media path leg endpoint at an intermediate network element. Reporting data comprising data identifying the determined one or more endpoints is generated. The reporting data is transmitted to an analysis system for network link quality analysis.

By determining one or more endpoints of a media path leg from signaling procedures used to control a communications session, embodiments of the present invention are able to determine a media path actually taken by the media content of the communications session.

By transmitting information relating to the endpoints determined from the signaling procedures to an analysis system, embodiments of the present invention are able to allow information relating to parts of a media path to be aggregated and associated with QoS information relating to the media path so that network link quality analysis can be conducted.

A communications session is typically conducted between respective terminating devices, for example the communications session could be a Voice over Internet Protocol (VoIP) telephone call conducted between terminating devices that are VoIP phones. Additionally a communications session typically includes use of signaling procedures, such as for example the Session Initiation Protocol (SIP), for the control of the communications session, and the use of media transfer procedures, such as for example the Real-time Transfer Protocol (RTP), for transmitting media content via one or more media paths established using at least part of the signaling procedures.

Intermediate network elements connected to network links may connect the terminating devices of a communications session in the telecommunications network. Pairs of intermediate network elements and/or pairs comprising a terminating device and an intermediate network may thus communicate with each other via these network links, which may include radio access networks, fixed wireless access networks, wireless networks, private data communications networks and/or the Internet, as described above. The network links in the telecommunications network may be at least partially provided by and/or maintained by a service provider of the telecommunications network.

Each media path of a communications session includes media path legs which are each established between respective media path leg endpoints. Each media path leg relates to a media transfer session (e.g. RTP session) that is established between the endpoints of the media path leg by signaling procedures, where each endpoint of a media path leg could be an intermediate network element or a terminating device.

Some embodiments comprise determining one or more endpoints of a media path leg using at least part of the signaling procedures of the communications session. The determined media path leg endpoints include a media path leg endpoint at an intermediate network element, such that points in the media path besides the terminating devices of the communications session can be determined. These media path leg endpoints can then be reported to an analysis system to allow network link quality analysis to be conducted.

The determining of one or more endpoints of a media path leg may be conducted by a network element responsible for conducting signaling procedures for the communications session. This network element could be an intermediate network element which includes a media path leg endpoint for the communications session, for example the network element could include a SIP proxy, as described above.

Alternatively the determining of one or more endpoints of a media path leg could be conducted by a network element that is a switching network element responsible for conducting signaling procedures for the communications session, the switching network element not including a media path leg endpoint for the communications session. In this case the network element may include a signaling component that communicates (e.g. using a gateway control protocol, as described in above) with a second network element that includes a media processing component, where the second network element includes a media path leg endpoint.

Some embodiments include receiving quality of service data relating to the communications session at an intermediate network element which includes a media path leg endpoint for the communications session; and transmitting the received quality of service data to the analysis system for network link quality analysis.

Some embodiments additionally or alternatively include measuring a quality of service characteristic relating to the communications session at an intermediate network element which includes a media path leg endpoint for the communications session; generating quality of service data on the basis of the measured quality of service characteristic; and transmitting the quality of service data to the analysis system for network link quality analysis.

As a result, the analysis system may associate information relating to a media path with quality of service information relating to the media path so that network link quality analysis can be conducted.

Some embodiments include receiving reporting data relating to a plurality of different communications sessions; processing the reporting data to determine at least part of the media paths established for each of the plurality of different communications sessions; and assessing network link quality for at least one network link in the data communications network on the basis of the media path determinations and quality of service data relating to the different communications session.

As a result, the analysis system may conduct network link quality analysis on the basis of information it receives in relation to a plurality of media paths and the quality of service information of those media paths.

In order to conduct network link quality analysis, some embodiments include receiving reporting data from a plurality of different sources of the reporting data, different elements of the reporting data received from the different sources relating to different media path legs; correlating the reporting data received from the different sources; processing the correlated reporting data to determine at least a plurality of media path legs of the media path established for the communications session; and assessing network link quality for a plurality of network links in the data communications network on the basis of the media path determination and quality of service data relating to the communications session.

Correlation of reporting data may be performed on the basis of data identifying one or more characteristics of the communications session, the identifying data being received in the reporting data in addition to the data identifying the determined one or more endpoints.

Such embodiments are thus capable of correlating elements of reporting data relating to a communications session received from different sources, even if some of the elements of reporting data do not all contain the same characteristics of the communications session.

Some embodiments also include determining one or more additional endpoints of a media path leg from information received in the media path by an intermediate network element which includes a media path leg endpoint for the communications session; generating additional reporting data comprising data identifying the determined one or more additional endpoints; and transmitting the additional reporting data to the analysis system for network link quality analysis.

Such embodiments are thus capable of identifying media path leg endpoints from information received in the media path, as well as by identifying those media path leg endpoints from at least part of the signaling procedures of the communications session.

Some embodiments may also be used where the media path for a communications session includes an intermediate network element conducting network address translation, by: determining a media path leg endpoint of the network element conducting network address translation; generating network address translation reporting data comprising data identifying the media path leg endpoint of the network element conducting network address translation; and transmitting the network address translation reporting data to the analysis system for network link quality analysis.

Such embodiments may thus detect media path leg endpoints where a network element conducting network address translation lies on a media path leg.

Some embodiments may also be used where the signaling procedures include a network link resource reservation procedure, by determining one or more endpoints of a media path leg from the network link resource reservation procedure As a result, media path leg endpoints may also be detected using a network link resource reservation procedure.

Various measures (for example an analysis system) for monitoring network link quality in a telecommunications network are provided. The telecommunications network includes a plurality of intermediate network elements connected to network links via which communications sessions are conducted between respective terminating devices. A communications session comprises signaling procedures relating to the control of the communications session and media transfer procedures for transmitting media content via a media path established using at least part of the signaling procedures. The established media path includes media path legs which are each established between respective media path leg endpoints connected via a network link. The analysis system is configured to receive reporting data comprising data identifying determined one or more endpoints of a media path leg, the determined one or more endpoints including a media path leg endpoint at an intermediate network element. The analysis system is configured to process the reporting data to determine at least part of the media path established for the communications session. The analysis system is configured to assess network link quality for at least one network link in the data communications network on the basis of the media path determination and quality of service data relating to the communications session.

By receiving and processing reporting data comprising data identifying determined one or more endpoints of a media path leg, embodiments are able to allow information relating to parts of a media path to be aggregated and associated with quality of service information relating to the media path so that network link quality analysis can be conducted.

Preferably, network link quality analysis may be conducted on the basis of information received in relation to a plurality of media paths and the quality of service information of those media paths. For example, if a large proportion of the media paths with which a network element is associated exhibited poor Quality of Service (QoS), that network element and/or network links to which it is connected may be detected as a potential source of a QoS issue in the telecommunications network. The network element may thus be highlighted to service personnel of the telecommunications network by the analysis system, in order to assist in the detection and isolation of QoS issues in the telecommunications network.

The above embodiments are to be understood as illustrative examples of the invention. Further embodiments of the invention are envisaged as follows.

In an alternative embodiment of the invention a network element may aggregate portions of the information it gathers in relation to a communications session (e.g. in steps 300 and 302 of FIG. 3) into a plurality of communications session reports, rather than in a single such communications sessions report (e.g. as described in step 304). Each of these reports may be generated and transmitted once the information it contains has been determined by the network element, rather than after all the information relating to a particular communications session has been determined by the network element.

For example, one such report in the plurality of communications reports could contain the media path leg endpoints for the first leg of the first media path, the identifier of the media path, and the start and end times of that media path. Another such report could contain the media path leg endpoints for the first leg of the second media path, the communications session identifier, the signaling procedure identifier for the SIP session, and/or the start and/or end times of that media path.

Thus in this arrangement a network element gathering information in relation to a communications session need not be configured to associate together all the information it determines in relation to that communications session, and this task may instead be performed by the analysis system. In this case the analysis system may correlate all the reports it receives in relation to a communications session on the basis of matches between one or more of the identifying characteristics of a communications session contained in each report, where matching is done as described in step 308 of FIG. 3 above. The analysis system may thus be capable of correlating reports relating to a communications session even if some of the reports do not all contain the same identifying characteristics of the communications session.

In an alternative embodiment of the invention, communications sessions may be conducted between a terminating device in a first telecommunications network, and a terminating device in a foreign communications network. For example a first network element in the first telecommunications network may allow a media path to be established to the foreign network so that a communications session can be established with the terminating device in the foreign communications network. Information in relation to the media path in the foreign telecommunications network may not be transmitted to the analysis system in the telecommunications network, and therefore the analysis system may only conduct network link quality analysis in relation to the media path legs and/or endpoints of the portion of the media path in the first telecommunications network.

In an alternative embodiment of the invention, Quality of Service (QoS) information may be measured from the media path by a network element, in addition, or as an alternative to the network element gathering QoS information included in messages transmitted between the terminating devices of the communications session e.g. in the RTCP stream associated with the media path. The network element may measure QoS for example by measuring jitter, delay and/or data packet loss in the media content it receives in the media path.

The network element may associate the QoS information it measures and/or receives in this way with information it determines in relation to the communications session (e.g. in accordance with step 300 and/or 302 of FIG. 3), and may then generate and transmit reporting data information including the measured QoS information to the analysis system (e.g. in accordance with steps 304 and 306 of FIG. 3).

In this arrangement, the analysis system may receive QoS information in relation to different portions of a media path of a communications session. For example, the analysis system may receive a first set of QoS information in relation to the portion of the media path between a first terminating device and a network element, and a second set of QoS information in relation to the portion of the media path between that network element and a second terminating device.

The analysis system may thus associate network elements in the media path with the corresponding QoS information for the portion of media path in which they reside. As a result a more detailed analysis of network link quality may be made available by the analysis system, for example if the first portion of the media path exhibits a lower contribution to the QoS of the media path than the second portion of the media path. More accurate location of sources of potential sources of QoS issues in the telecommunications network may thus be facilitated by the analysis system.

In addition, or in the alternative, to the methods described above, QoS information and/or information relating to the endpoints of media path legs may be determined, by measurement or receipt, and transmitted to the analysis system in communications session reports by the terminating devices of a communications session.

In the above embodiments, SIP is used as a signaling procedure. In an alternative embodiment of the invention, different signaling procedures, such as ITU-T Recommendation H.323, may be monitored in addition or in the alternative.

In the above embodiments, the communications sessions are voice calls. Additionally, or in the alternative, the communications sessions may, for example, relate to video calls.

Embodiments of the invention are envisaged where the analysis system may be a service provided by a network element that is also capable of conducting processing in relation to communications sessions (e.g. signaling procedures and/or media transfer procedures). Therefore embodiments of the invention are envisaged where transmitting reporting data to an analysis system includes transmitting reporting data from (for example) software and/or hardware conducting signaling procedures and/or media transfer procedures at a server, to (for example) software and/or hardware implementing an analysis system at the same server.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for monitoring network link quality in a telecommunications network which includes a plurality of intermediate network elements connected to network links via which communications sessions are conducted between respective terminating devices, a said communications session comprising signaling procedures relating to control of the communications session and involving signaling messages being sent via a signaling path, and media transfer procedures for transmitting media content via a media path, wherein the media path is established using at least part of said signaling procedures, the established media path including media path legs which are each established between respective media path leg endpoints connected via a said network link, said signaling path being different from said established media path, the method comprising:
- determining one or more media path leg endpoints of a said media path leg from at least part of said signaling procedures relating to the control of the communications session, said determined one or more media path leg endpoints including a media path leg endpoint at a said intermediate network element;
- generating reporting data comprising data identifying said determined one or more media path leg endpoints; and
- transmitting said reporting data to an analysis system for network link quality analysis.

2. A method according to claim 1, wherein said communications sessions comprise voice calls.

3. A method according to claim 1, wherein said determined one or more media path leg endpoints are determined from signaling procedures relating to setup of a voice call.

4. A method according to claim 1, wherein said determining is conducted by a network element responsible for conducting signaling procedures for said communications session.

5. A method according to claim 4, wherein said network element is a said intermediate network element which includes a media path leg endpoint for the communications session.

6. A method according to claim 4, wherein said network element is a switching network element responsible for conducting signaling procedures for said communications session, said switching network element not including a media path leg endpoint for the communications session.

7. A method according to claim 4, comprising, at a further network element:
- determining one or more further media path leg endpoints of a said media path leg from at least part of said signaling procedures, said determined one or more further media path leg endpoints including a media path leg endpoint at a further said intermediate network element;
- generating further reporting data comprising data identifying said determined one or more further media path leg endpoints; and
- transmitting said further reporting data to said analysis system for network link quality analysis.

8. A method according to claim 1, comprising:
receiving quality of service data relating to said communications session at an intermediate network element which includes a media path leg endpoint for the communications session; and
transmitting said received quality of service data to said analysis system for network link quality analysis.

9. A method according to claim 1, comprising:
measuring a quality of service characteristic relating to said communications session at an intermediate network element which includes a media path leg endpoint for the communications session;
generating quality of service data on the basis of said measured quality of service characteristic; and
transmitting said quality of service data to said analysis system for network link quality analysis.

10. A method according to claim 1, comprising:
receiving said reporting data;
processing said reporting data to determine at least part of the media path established for the communications session; and
assessing network link quality for at least one network link in the data communications network on the basis of said media path determination and quality of service data relating to said communications session.

11. A method according to claim 10, comprising receiving at least part of said quality of service data from a terminating device for the communications session.

12. A method according to claim 10, comprising receiving at least part of said quality of service data from an intermediate network element which includes a media path leg endpoint for the communications session.

13. A method according to claim 10, comprising:
receiving reporting data relating to a plurality of different communications sessions;
processing said reporting data to determine at least part of the media paths established for each of the plurality of different communications sessions; and
assessing network link quality for at least one network link in the data communications network on the basis of said media path determinations and quality of service data relating to said different communications sessions.

14. A method according to claim 10, comprising:
receiving reporting data from a plurality of different sources of said reporting data, different elements of said reporting data received from said different sources relating to different media path legs;
correlating said reporting data received from said different sources;
processing said correlated reporting data to determine at least a plurality of media path legs of the media path established for the communications session; and
assessing network link quality for a plurality of network links in the data communications network on the basis of said media path determination and quality of service data relating to said communications session.

15. A method according to claim 14, wherein said correlating is performed on the basis of data identifying one or more characteristics of the communications session, said session identifying data being received in said reporting data in addition to said data identifying said determined one or more endpoints.

16. A method according to claim 15, wherein said session identifying data comprises one or more indications of time relating to when a communications session occurred.

17. A method according to claim 15, wherein said session identifying data comprises a unique identifier of a signaling procedure relating to the communications session.

18. A method according to claim 15, wherein said session identifying data comprises a unique identifier of the communications session occurring between the terminating devices.

19. A method according to claim 15, wherein said session identifying data comprises a unique identifier of a media flow established as part of said communications session, said media flow occurring only in a part of said media path.

20. A method according to claim 1, comprising:
determining one or more additional media path leg endpoints of a said media path leg from information received in the media path by an intermediate network element which includes a media path leg endpoint for the communications session;
generating additional reporting data comprising data identifying said determined one or more additional media path leg endpoints; and
transmitting said additional reporting data to said analysis system for network link quality analysis.

21. A method according to claim 1, wherein the media path for a communications session includes an intermediate network element conducting network address translation, the method comprising:
   determining a media path leg endpoint of said network element conducting network address translation;
   generating network address translation reporting data comprising data identifying said media path leg endpoint of said network element conducting network address translation; and
   transmitting said network address translation reporting data to said analysis system for network link quality analysis.

22. A method according to claim 21, comprising determining said media path leg endpoint of said network element conducting network address translation from information received by an intermediate network element from said network element conducting network address translation.

23. A method according to claim 21, comprising determining said media path leg endpoint of said network element conducting network address translation from at least part of said signaling procedures.

24. A method according to claim 21, comprising determining said media path leg endpoint of said network element conducting network address translation from media data received in the media path from the said network element conducting network address translation.

25. A method according to claim 1, wherein said signaling procedures include a network link resource reservation procedure, and wherein said method comprises determining one or more media path leg endpoints of a said media path leg from said network link resource reservation procedure.

26. A method according to claim 1, wherein said one or more media path leg endpoints of a said media path leg include an identifier of a receiving network element in the media path to which media data is transmitted in the media path leg.

27. A method according to claim 1, wherein the data identifying one or more media path leg endpoints comprises one or more IP addresses for said one or more media path leg endpoints.

28. A network element for use in monitoring network link quality in a telecommunications network, the telecommunications network including a plurality of intermediate network elements connected to network links via which communications sessions are conducted between respective terminating devices, a said communications session comprising signaling procedures relating to control of the communications session and involving signaling messages being sent via a signaling path, and media transfer procedures for transmitting media content via a media path established using at least part of said signaling procedures, the established media path including media path legs which are each established between respective media path leg endpoints connected via a said network link, said signaling path being different from said established media path, the network element being configured to:
   determine one or more media path leg endpoints of a said media path leg from at least part of said signaling procedures relating to the control of the communications sessions, said determined one or more media path leg endpoints including a media path leg endpoint at a said intermediate network element;
   generate reporting data comprising data identifying said determined one or more media path leg endpoints; and
   transmit said reporting data to an analysis system for network link quality analysis.

29. A network element according to claim 28, the network element being configured to:
   measure a quality of service characteristic relating to said communications session at the said network element which includes a media path leg endpoint for the communications session;
   generate quality of service data on the basis of said measured quality of service characteristic; and
   transmit said quality of service data to said analysis system for network link quality analysis.

30. A network element according to claim 28, the network element being configured to:
   receive quality of service data relating to said communications session at the said network element which includes a media path leg endpoint for the communications session; and
   transmit said received quality of service data to said analysis system for network link quality analysis.

31. An analysis system for monitoring network link quality in a telecommunications network, the telecommunications network including a plurality of intermediate network elements connected to network links via which communications sessions are conducted between respective terminating devices, a said communications session comprising signaling procedures relating to control of the communications session and involving signaling messages being sent via a signaling path, and media transfer procedures for transmitting media content via a media path established using at least part of said signaling procedures, the established media path including media path legs which are each established between respective media path leg endpoints connected via a said network link, said signaling path being different from said established media path, the analysis system being configured to:
   receive reporting data comprising data identifying one or more determined media path leg endpoints of a said media path leg, said determined one or more media path leg endpoints including a media path leg endpoint at a said intermediate network element;
   process said reporting data to determine at least part of the media path established for the communications session; and
   assess network link quality for at least one network link in the data communications network on the basis of said media path determination and quality of service data relating to said communications session.

* * * * *